US012609222B2

(12) United States Patent
Takezawa et al.

(10) Patent No.: US 12,609,222 B2
(45) Date of Patent: Apr. 21, 2026

(54) RARE-EARTH COBALT PERMANENT MAGNET, METHOD OF MANUFACTURING THE SAME, AND DEVICE

(71) Applicants: KYUSHU INSTITUTE OF TECHNOLOGY, Kitakyushu (JP); TOKIN Corporation, Shiroishi (JP)

(72) Inventors: Masaaki Takezawa, Kitakyushu (JP); Hiroaki Machida, Sendai (JP); Teruhiko Fujiwara, Sendai (JP); Yu Kanamori, Sendai (JP)

(73) Assignees: KYUSHU INSTITUTE OF TECHNOLOGY, Kitakyushu (JP); TOKIN CORPORATION, Shiroishi (JP)

( * ) Notice: Subject to any disclaimer, the term of this patent is extended or adjusted under 35 U.S.C. 154(b) by 0 days.

(21) Appl. No.: 16/874,566

(22) Filed: May 14, 2020

(65) Prior Publication Data

US 2020/0365301 A1 Nov. 19, 2020

(30) Foreign Application Priority Data

May 15, 2019 (JP) ................................ 2019-091966

(51) Int. Cl.
*H01F 1/055* (2006.01)
*B22F 3/24* (2006.01)
(Continued)

(52) U.S. Cl.
CPC ................ *H01F 1/055* (2013.01); *B22F 3/24* (2013.01); *C22C 30/02* (2013.01);
(Continued)

(58) Field of Classification Search
None
See application file for complete search history.

(56) References Cited

U.S. PATENT DOCUMENTS 3,982,971 A 9/1976 Yamanaka et al.
4,322,257 A 3/1982 Menth et al.
(Continued)

FOREIGN PATENT DOCUMENTS

CN 104685581 A 6/2015
CN 104916382 A 9/2015
(Continued)

OTHER PUBLICATIONS

Liu, J. Appl. Phys., vol. 69, No. 8. (Year: 1991).*
(Continued)

*Primary Examiner* — Xiaowei Su
(74) *Attorney, Agent, or Firm* — McCoy Russell LLP

(57) ABSTRACT

A rare-earth cobalt permanent magnet according to the present disclosure comprises: 24 to 26 mass % of a rare-earth element R including Sm; 25 to 27 mass % of Fe; 4.0 to 7.0 mass % of Cu; 2.0 to 3.5 mass % of Zr; and Co and an unavoidable impurity as a remainder. The rare-earth element R is any one of a combination of Sm and Nd, a combination of Sm and Pr, or a combination of Sm, Nd, and Pr. The rare-earth cobalt permanent magnet includes a cell phase that includes a crystalline phase of a $Th_2Zn_{17}$ structure and a cell wall that includes a crystalline phase of an $RCo_5$ structure enclosing the cell phase, and the concentration of the rare-earth element R in the cell wall is higher than the concentration of the rare-earth element R in the cell phase by no less than 25 atomic %.

7 Claims, 4 Drawing Sheets

(51) Int. Cl.
*C22C 30/02* (2006.01)
*H01F 41/02* (2006.01)

(52) U.S. Cl.
CPC .... *H01F 41/0266* (2013.01); *B22F 2003/248* (2013.01); *B22F 2301/45* (2013.01); *C22C 2202/02* (2013.01)

(56) References Cited

U.S. PATENT DOCUMENTS

| | | | |
|---|---|---|---|
| 6,726,781 B2 | 4/2004 | Walmer et al. | |
| 9,773,592 B2 | 9/2017 | Sakurada et al. | |
| 9,774,219 B2 | 9/2017 | Horiuchi et al. | |
| 10,770,208 B2 | 9/2020 | Horiuchi et al. | |
| 11,081,264 B2 | 8/2021 | Horiuchi et al. | |
| 2005/0189042 A1 | 9/2005 | Ohashi | |
| 2013/0076184 A1 | 3/2013 | Horiuchi et al. | |
| 2014/0139063 A1 | 5/2014 | Horiuchi et al. | |
| 2014/0139305 A1 | 5/2014 | Horiuchi et al. | |
| 2015/0147228 A1 | 5/2015 | Endo et al. | |
| 2015/0221422 A1* | 8/2015 | Sakurada | H01F 1/0557 310/152 |
| 2015/0262740 A1 | 9/2015 | Fujiwara et al. | |
| 2015/0270040 A1 | 9/2015 | Horiuchi et al. | |
| 2015/0279528 A1 | 10/2015 | Suzuki | |
| 2015/0380134 A1 | 12/2015 | Machida et al. | |
| 2016/0086702 A1* | 3/2016 | Horiuchi | C22C 30/00 310/44 |
| 2017/0002445 A1 | 1/2017 | Hagiwara et al. | |
| 2017/0162304 A1 | 6/2017 | Horiuchi et al. | |
| 2017/0271059 A1 | 9/2017 | Horiuchi et al. | |
| 2017/0271060 A1 | 9/2017 | Takahashi et al. | |
| 2017/0365382 A1 | 12/2017 | Horiuchi et al. | |
| 2017/0365383 A1* | 12/2017 | Horiuchi | H01F 1/055 |
| 2019/0333660 A1 | 10/2019 | Ito et al. | |
| 2020/0243232 A1* | 7/2020 | Takezawa | H01F 41/0266 |
| 2020/0312497 A1 | 10/2020 | Muroya et al. | |
| 2020/0365301 A1 | 11/2020 | Takezawa et al. | |
| 2021/0090768 A1 | 3/2021 | Ishikura et al. | |
| 2021/0249165 A1 | 8/2021 | Machida et al. | |
| 2023/0095210 A1 | 3/2023 | Machida et al. | |
| 2023/0253838 A1 | 8/2023 | Amaya et al. | |
| 2024/0047104 A1 | 2/2024 | Takezawa et al. | |
| 2024/0212895 A1 | 6/2024 | Kuniyoshi | |

FOREIGN PATENT DOCUMENTS

| | | | |
|---|---|---|---|
| CN | 107204222 A | 9/2017 | |
| CN | 108352231 A | 7/2018 | |
| JP | S558468 A | 1/1980 | |
| JP | S5563806 A | 5/1980 | |
| JP | S5923803 A | 2/1984 | |
| JP | S61220307 A | 9/1986 | |
| JP | S61220308 A | 9/1986 | |
| JP | 2005243884 A | 9/2005 | |
| JP | 2014103239 A | 6/2014 | |
| JP | 2015111675 A | 6/2015 | |
| JP | 2015188072 A | 10/2015 | |
| JP | 2017168827 A | 9/2017 | |
| JP | 2018100450 A | 6/2018 | |
| JP | 2018147986 A | 9/2018 | |
| JP | 2020188140 A | 11/2020 | |
| JP | 2021125593 A | 8/2021 | |
| WO | 2015140829 A1 | 9/2015 | |
| WO | 2016151621 A1 | 9/2016 | |
| WO | 2017046827 A1 | 3/2017 | |
| WO | WO-2017061126 A1 * | 4/2017 | B22F 3/00 |
| WO | 2017158646 A1 | 9/2017 | |

OTHER PUBLICATIONS

Japanese Patent Office, Office Action Issued in Application No. 2019-091966, Nov. 2, 2021, 10 pages. (Submitted with Machine Translation).

Machida, H. et al., "Magnetic Domain Structures and Magnetic Properties of Lightly Nd doped Sm—Co Magnets with High Squareness and High Heat Resistance," Proceedings of the 21st International Conference on Magnetism (ICM2018), Jul. 15, 2018, San Francisco, California, 4 pages.

Machida, H. et al., "Abstacts of Magnetic properties and microstructures of high heat-resistance Sm—Co magnets with high Fe and low Zr content," Proceedings of the 64th Annual Conference on Magnetism and Magnetic Materials, Nov. 7, 2019, Las Vegas, Nevada, Available as Early as Oct. 28, 2019, 2 pages.

Machida, H. et al., "Magnetic properties and microstructures of high heat-resistance Sm—Co magnets with high Fe and low Zr content," AIP Advances, vol. 9, No. 12, 125042, Dec. 26, 2019, 6 pages.

United States Patent and Trademark Office, Office Action Issued in U.S. Appl. No. 17/160,025, Jul. 27, 2022, 18 pages.

Japanese Patent Office, Office Action Issued in Application No. 2020-018900, Aug. 31, 2022, 10 pages. (Submitted with Machine Translation).

United States Patent and Trademark Office, Restriction Requirement Issued in U.S. Appl. No. 17/160,025, Mar. 21, 2022, 7 pages.

United States Patent and Trademark Office, Final Office Action Issued in U.S. Appl. No. 17/160,025, Jan. 5, 2023, 20 pages.

United States Patent and Trademark Office, Advisory Action Issued in U.S. Appl. No. 17/160,025, Mar. 16, 2023, 5 pages.

United States Patent and Trademark Office, Office Action Issued in U.S. Appl. No. 17/160,025, May 31, 2023, 10 pages.

United States Patent and Trademark Office, Non-Final Office Action Issued in U.S. Appl. No. 17/160,025, Nov. 2, 2023, 18 pages.

United States Patent and Trademark Office, Final Office Action Issued in U.S. Appl. No. 17/160,025, Aug. 12, 2024, 19 pages.

United States Patent and Trademark Office, Advisory Action Issued in U.S. Appl. No. 17/160,025, Nov. 21, 2024, 4 pages.

China National Intellectual Property Administration, Office Action and Search Report Issued in Application No. 202110156864.2, Jan. 18, 2025, 19 pages.

United States Patent and Trademark Office, Non-Final Office Action Issued in U.S. Appl. No. 17/160,025, Feb. 6, 2025, 16 pages.

United States Patent and Trademark Office, Final Office Action Issued in U.S. Appl. No. 17/935,463, Jun. 3, 2025, 26 pages.

Japanese Patent Office, Office Action Issued in Application No. 2021-159333, Jul. 26, 2022, 7 pages. (Submitted with Machine Translation).

United States Patent and Trademark Office, Non-Final Office Action Issued in U.S. Appl. No. 17/935,463, Jan. 15, 2025, 24 pages.

State Intellectual Property Office of the People's Republic of China, Office Action and Search Report Issued in Application No. 202010403308.6, Mar. 31, 2025, 13 pages. (Submitted with Machine Translation).

United States Patent and Trademark Office, Advisory Action Issued in U.S. Appl. No. 17/160,025, Oct. 2, 2025, 3 pages.

United States Patent and Trademark Office, Final Action Issued in U.S. Appl. No. 17/160,025, Jul. 29, 2025, 24 pages.

United States Patent and Trademark Office, Non-Final Office Action Issued in U.S. Appl. No. 18/354,532, Sep. 16, 2025, 51 pages.

United States Patent and Trademark Office, Non-Final Office Action Issued in U.S. Appl. No. 17/935,463, Dec. 5, 2025, 32 pages.

United States Patent and Trademark Office, Notice of Allowance Issued in U.S. Appl. No. 17/160,025, Feb. 6, 2026, 27 pages.

United States Patent and Trademark Office, Final Office Action Issued in U.S. Appl. No. 18/354,532, Mar. 6, 2026, 28 pages.

* cited by examiner

RARE-EARTH COBALT PERMANENT MAGNET, METHOD OF MANUFACTURING THE SAME, AND DEVICE

CROSS-REFERENCE TO RELATED APPLICATION

This application is based upon and claims the benefit of priority from Japanese patent application No. 2019-091966, filed on May 15, 2019, the disclosure of which is incorporated herein in its entirety by reference.

BACKGROUND

The present disclosure relates to a rare-earth cobalt permanent magnet, a method of manufacturing the rare-earth cobalt permanent magnet, and a device.

Some known rare-earth cobalt permanent magnets contain, for example, Fe, Cu, Zr, or the like from a variety of standpoints such as improving their magnetic characteristics.

Japanese Unexamined Patent Application Publication No. 2005-243884 discloses a technology related to a rare-earth cobalt permanent magnet having a $TbCu_7$ structure. Japanese Unexamined Patent Application Publication No. 2015-111675 discloses a technology related to a Sm—Co magnet having a high iron concentration composition.

SUMMARY

The magnetic force of rare-earth cobalt permanent magnets varies little with the temperature, and they are resistant to rusting. Thus, rare-earth cobalt permanent magnets are used widely in a variety of devices. From the standpoint of further increasing the performance of such devices, there is a demand for a rare-earth cobalt permanent magnet having even superior magnetic characteristics (in particular, a high squareness ratio).

To address the above issue, the present disclosure is directed to providing a rare-earth cobalt permanent magnet having superior magnetic characteristics, a method of manufacturing such a rare-earth cobalt permanent magnet, and a device that includes such a rare-earth cobalt permanent magnet.

A rare-earth cobalt permanent magnet according to one aspect of the present disclosure comprises: 24 to 26 mass % of a rare-earth element R including Sm; 25 to 27 mass % of Fe; 4.0 to 7.0 mass % of Cu; 2.0 to 3.5 mass % of Zr; and Co and an unavoidable impurity as a remainder. The R is any one of a combination of Sm and Nd (where 0<Nd≤25 mass %, and a remainder is Sm), a combination of Sm and Pr (where 0<Pr≤25 mass %, and a remainder is Sm), or a combination of Sm, Nd, and Pr (where 0<Nd+Pr≤25 mass %, and a remainder is Sm). The rare-earth cobalt permanent magnet includes a cell phase that includes a crystalline phase of a $Th_2Zn_{17}$ structure, and a cell wall that includes a crystalline phase of an $RCo_5$ structure enclosing the cell phase. A concentration of the R in the cell wall is higher than a concentration of the R in the cell phase by no less than 25 atomic %.

A method of manufacturing a rare-earth cobalt permanent magnet according to one aspect of the present disclosure includes: a step (I) of preparing an alloy comprising, 24 to 26 mass % of a rare-earth element R including Sm; 25 to 27 mass % of Fe; 4.0 to 7.0 mass % of Cu; 2.0 to 3.5 mass % of Zr; and Co and an unavoidable impurity as a remainder (the R is any one of a combination of Sm and Nd (where 0<Nd≤25%, and a remainder is Sm), a combination of Sm and Pr (where 0<Pr≤25%, and a remainder is Sm), or a combination of Sm, Nd, and Pr (where 0<Nd+Pr≤25%, and a remainder is Sm)); a step (II) of pulverizing the alloy into powder; a step (III) of compression-molding the powder into a molded body; a step (IV) of sintering the molded body into a sintered body by heating the molded body at 1190 to 1225° C. for 0.5 to 3.0 hours; a solution heat treatment step (V) of heating the sintered body at 1120° C. to 1180° C. for 20 to 100 hours; a rapid cooling step (VI) of lowering a temperature at a cooling rate of no less than 60° C./min at least from a solution heat treatment temperature to 600° C. after the solution heat treatment step (V); and an aging treatment step (VII) of forming a cell phase that includes a crystalline phase of a $Th_2Zn_{17}$ structure and a cell wall that includes a crystalline phase of an $RCo_5$ structure enclosing the cell phase. A concentration of the R in the cell wall is higher than a concentration of the R in the cell phase by no less than 25 atomic %.

A device according to one aspect of the present disclosure includes the above rare-earth cobalt permanent magnet.

The present disclosure can provide a rare-earth cobalt permanent magnet having superior magnetic characteristics, a method of manufacturing such a rare-earth cobalt permanent magnet, and a device that includes such a rare-earth cobalt permanent magnet.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Figure 1:
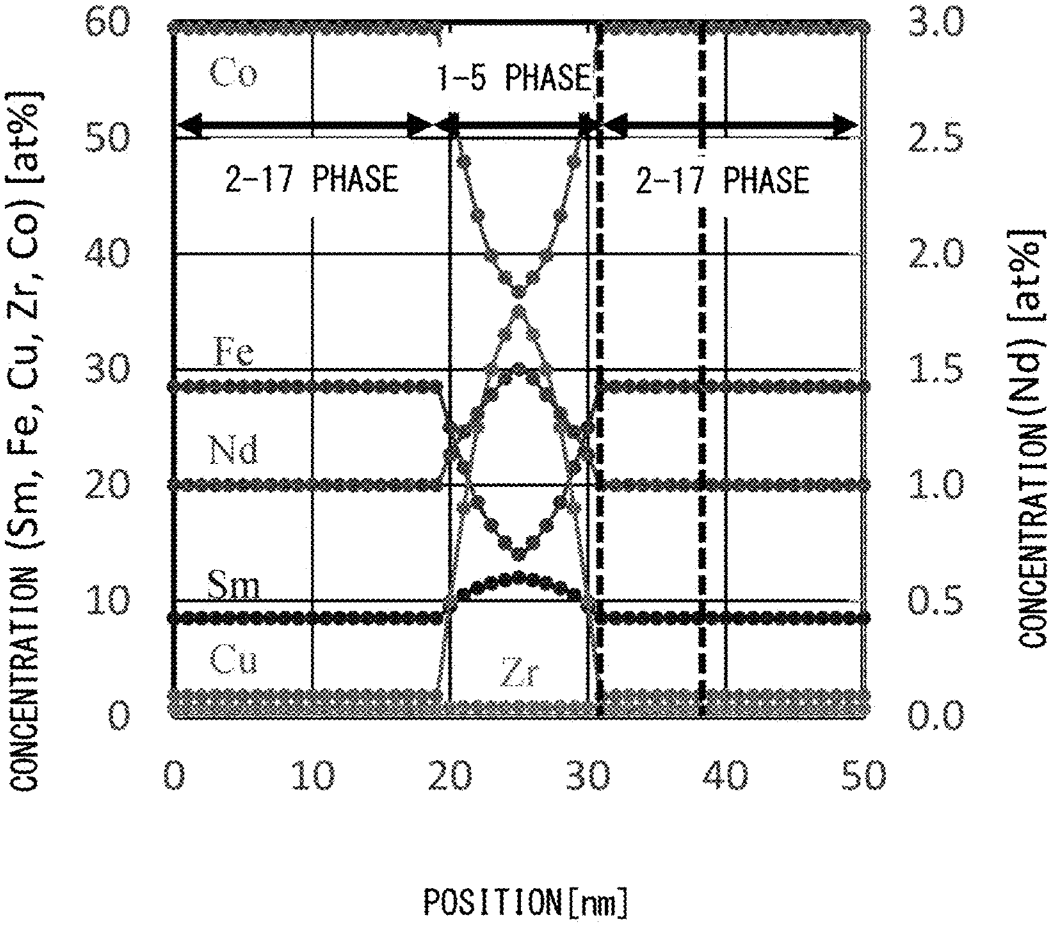
FIG. 1 is a graph illustrating a change in the composition of a rare-earth cobalt permanent magnet.

Hereinafter, a rare-earth cobalt permanent magnet and a method of manufacturing the rare-earth cobalt permanent magnet according to the present disclosure will be described in detail.

Rare-Earth Cobalt Permanent Magnet

A rare-earth cobalt permanent magnet according to the present disclosure comprises, 24 to 26 mass % of a rare-earth element R including Sm; 25 to 27 mass % of Fe; 4.0 to 7.0 mass % of Cu; 2.0 to 3.5 mass % of Zr; and Co and an unavoidable impurity as a remainder. In the above, the rare-earth element R is any one of (1) a combination of Sm and Nd (in which 0<Nd≤25 mass %, and a remainder is Sm), (2) a combination of Sm and Pr (in which 0<Pr≤25 mass %, and a remainder is Sm), or (3) a combination of Sm, Nd, and Pr (in which 0<Nd+Pr≤25 mass %, and a remainder is Sm). Note that, in this specification, a numerical range of "A to B mass %" includes the both values of A and B.

The rare-earth cobalt permanent magnet according to the present disclosure includes a cell phase that includes a crystalline phase of a $Th_2Zn_{17}$ structure and a cell wall that includes a crystalline phase of an $RCo_5$ structure enclosing the cell phase. The concentration of the rare-earth element R in the cell wall is higher than the concentration of the rare-earth element R in the cell phase by no less than 25 at % (atomic %).

The composition of Cu described above is preferably 4.2 to 4.7 mass %. If the amount of Cu is too small, a sufficient magnetic coercive force (Hcj) cannot be obtained. If the amount of Cu is too large, the saturation magnetization decreases. The composition of Zr described above is preferably 2.1 to 2.5 mass %. If the amount of Zr is too small, the crystal structure fails to be stable. Thus, a sufficient magnetic coercive force (Hcj) cannot be obtained in a region with a large amount of Fe. If the amount of Zr is too large, the saturation magnetization decreases.

The density of the rare-earth cobalt permanent magnet described above is 8.20 to 8.45 $g/cm^3$ or more preferably 8.25 to 8.40 $g/cm^3$.

In the rare-earth cobalt permanent magnet according to the present disclosure, the remainder (i.e., 36.5 to 45 mass %) comprises Co (cobalt) and an unavoidable impurity. An unavoidable impurity is an element that is mixed in unavoidably from a source material or in the manufacturing process. Specific but non-limiting examples of the unavoidable impurity include C (carbon), N (nitrogen), P (phosphorus), S (sulfur), Al (aluminum), Ti (titanium), Cr (chromium), Mn (manganese), Ni (nickel), Hf (hafnium), Sn (tin), and W (tungsten). In the present disclosure, the content ratio of the unavoidable impurity relative to the total amount of the rare-earth cobalt permanent magnet is preferably no more than 5 mass % in total, more preferably no more than 1 mass % in total, or even more preferably no more than 0.1 mass % in total.

The content ratio of each element in the rare-earth cobalt permanent magnet can be measured with the use of energy-dispersive X-ray spectrometry (EDX), for example.

The rare-earth cobalt permanent magnet according to the present disclosure includes a crystalline phase of a $Th_2Zn_{17}$ structure (also referred to below as a 2-17 phase) as a primary phase. The $Th_2Zn_{17}$ structure is a crystal structure having an R-3m space group. In the present disclosure, normally, a rare-earth element and Zr occupy the Th site, and Co, Cu, Fe, and Zr occupy the Zn site. In addition, the rare-earth cobalt permanent magnet according to the present disclosure includes a crystalline phase of an $RCo_5$ structure (also referred to below as a 1-5 phase). In the 1-5 phase, normally, a rare-earth element and Zr occupy the R site, and Co, Cu, and Fe occupy the Co site.

The rare-earth cobalt permanent magnet according to the present disclosure may include a crystalline phase of a $TbCu_7$ structure (also referred to below as a 1-7 phase). In the 1-7 phase, normally, a rare-earth element and Zr occupy the Tb site, and Co, Cu, and Fe occupy the Cu site. In the present disclosure, the 1-7 phase is a crystalline phase that is present mainly before an aging treatment step (VII) described later, and the 2-17 phase and the 1-5 phase are each a phase formed through the aging treatment step (VII) described later. The crystal structure can be identified through a known method, such as X-ray diffractometry.

Figure 2:
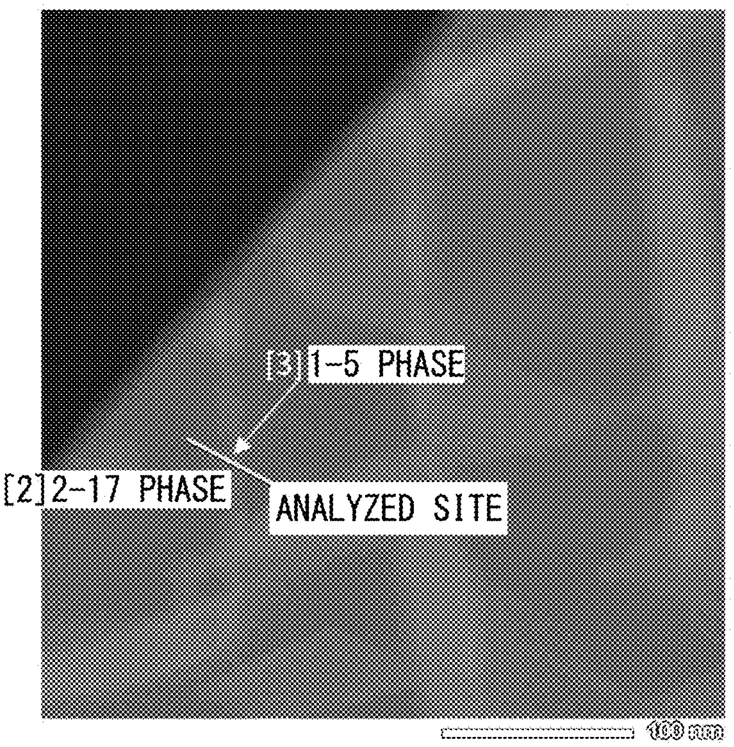
FIG. 2 illustrates a TEM image of a rare-earth cobalt permanent magnet.

FIG. 1 is a graph illustrating a change in the composition of the rare-earth cobalt permanent magnet and illustrates a change in the composition at an analyzed site in a TEM image of the rare-earth cobalt permanent magnet illustrated in FIG. 2. In other words, FIG. 1 illustrates a change in the composition of the rare-earth cobalt permanent magnet through the "2-17 phase," the "1-5 phase," and the "2-17 phase" in sequence. Here, the 2-17 phase corresponds to the crystalline phase of the cell phase, and the 1-5 phase corresponds to the crystalline phase of the cell wall enclosing the cell phase.

As illustrated in FIG. 1, the ratios of Sm, Nd, and Cu have increased in the 1-5 phase as compared to those in the 2-17 phase. Meanwhile, the ratios of Fe and Co have decreased in the 1-5 phase as compared to those in the 2-17 phase. The ratio of Zr stays substantially constant in the 1-5 phase and the 2-17 phase.

In this manner, in the rare-earth cobalt permanent magnet according to the present embodiment, Sm and Nd show the same tendency in the change in the composition from the cell phase (2-17 phase) to the cell wall (1-5 phase) in the rare-earth cobalt permanent magnet. This tendency applies similarly to a combination of Sm and Pr and to a combination of Sm, Nd, and Pr. In other words, in the present embodiment, Sm and at least one of Nd and Pr show the same tendency in the change in the composition from the cell phase to the cell wall in the rare-earth cobalt permanent magnet.

In the present embodiment, the concentration of the rare-earth element R in the cell wall is higher than the concentration of the rare-earth element R in the cell phase by no less than 25 at % (atomic %). Here, the rare-earth element R is any one of (1) a combination of Sm and Nd, (2) a combination of Sm and Pr, or (3) a combination of Sm, Nd, and Pr. Such a configuration can provide a rare-earth cobalt permanent magnet having superior magnetic characteristics, that is, a high squareness ratio. Specifically, a rare-earth cobalt permanent magnet having a squareness ratio of no less than 63% can be obtained, where the squareness ratio is expressed by the ratio (Hk/Hcj) of a magnetic field (Hk) to a magnetic coercive force (Hcj). The squareness ratio is a physical quantity expressed by Hk/Hcj, where Hk is a reverse magnetic field in which the magnetic flux density is at 90% of the residual magnetic flux density.

In the present embodiment, the magnetic coercive force (Hcj) is considered to appear as a magnetic domain wall is pinned between the 2-17 phase and the 1-5 phase at the time of a magnetic domain wall displacement. The magnetic coercive force (Hcj) is the magnitude of a magnetic field in the opposite direction that is required to demagnetize a magnetic body magnetized in a certain direction.

In the present embodiment, the concentration of the rare-earth element R in the cell wall (1-5 phase) is higher than the concentration of the rare-earth element R in the cell phase (2-17 phase) by no less than 25 at %. Therefore, the displacement of the magnetic domain wall can be pinned effectively with the cell wall (1-5 phase).

In the present embodiment, as illustrated in FIG. 1, when the cell phase (2-17 phase) and the cell wall (1-5 phase) are separated from each other, Fe is concentrated in the cell phase (2-17 phase), and Cu is concentrated in the cell wall (1-5 phase). This improves the squareness ratio Hk/Hcj of the rare-earth cobalt permanent magnet, and a maximum energy integral (BH)m increases. Here, the maximum energy integral (BH)m is maximum magnetostatic energy that can be retained by a magnetic body and represents a maximum value of an integral of a magnetic flux density B and a magnetic field H on a B-H attenuation curve in the second quadrant (attenuation curve) of a magnetization curve (B-H curve).

Figure 3:
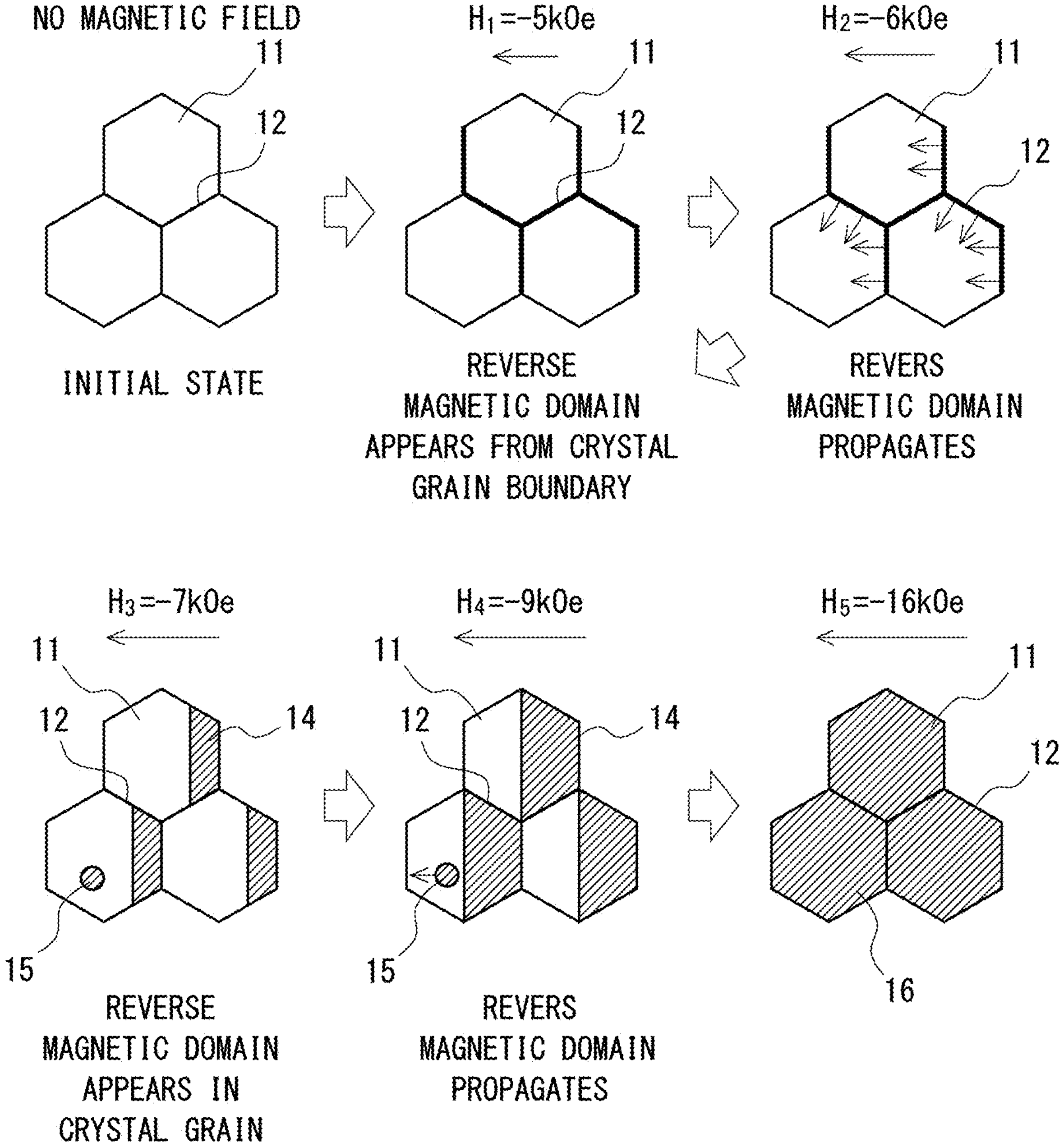
FIG. 3 is a schematic diagram for describing a process of propagation of a reverse magnetic domain in a rare-earth cobalt permanent magnet.

Next, with reference to FIG. 3, a process of propagation of a reverse magnetic domain in the rare-earth cobalt permanent magnet according to the present embodiment will be described. As illustrated in FIG. 3, the rare-earth cobalt permanent magnet includes crystal grains 11 and crystal grain boundaries 12, which are boundaries between the crystal grains 11. In an initial state, that is, in a state in which no reverse magnetic field is being applied, no reverse magnetic domain appears.

When a reverse magnetic field of $H_1$=−5 kOe is applied to the rare-earth cobalt permanent magnet, reverse magnetic domains appear from the crystal grain boundaries 12. Thereafter, when the reverse magnetic field is intensified and a reverse magnetic field of $H_2$=−6 kOe is applied, the reverse magnetic domains propagate from the crystal grain boundaries 12 into the crystal grains 11 (see the arrows in FIG. 3). When the reverse magnetic field is further intensified and a reverse magnetic field of $H_3$=−7 kOe is applied, reverse magnetic domains 14 spread in the crystal grains 11, and a reverse magnetic domain 15 appears in the crystal grains 11. When the reverse magnetic field is further intensified and a reverse magnetic field of $H_4$=−9 kOe is applied, the reverse magnetic domains 14 in the crystal grains 11 further spread, and the reverse magnetic domain 15 that has appeared in the crystal grains 11 propagates within the crystal grains 11. Thereafter, when the reverse magnetic field is intensified and a reverse magnetic domain of $H_5$=−16 kOe is applied, a reverse magnetic domain 16 spreads throughout the crystal grains 11, and the magnetization reversal of the rare-earth cobalt permanent magnet is completed. The values of the reverse magnetic fields $H_1$ to $H_5$ illustrated in FIG. 3 are examples, and the values of the reverse magnetic fields $H_1$ to $H_5$ may differ from the above in the present embodiment.

In the rare-earth cobalt permanent magnet according to the present embodiment, when a reverse magnetic field is applied to the rare-earth cobalt permanent magnet as described above, the reverse magnetic domains that have appeared from the crystal grain boundaries 12 propagate into the crystal grains 11, the reverse magnetic domain 15 then appears in the crystal grains 11, and the reverse magnetic domain propagates throughout the crystal grains 11. As the rare-earth cobalt permanent magnet according to the present embodiment has such a magnetization reversal mechanism, the rare-earth cobalt permanent magnet exhibits a high squareness ratio.

Method of Manufacturing Rare-Earth Cobalt Permanent Magnet

Next, a method of manufacturing the rare-earth cobalt permanent magnet according to the present embodiment will be described.

A method of manufacturing the rare-earth cobalt permanent magnet according to the present embodiment includes:

a. a step (I) of preparing an alloy comprising, 24 to 26 mass % of a rare-earth element R including Sm, 25% to 27 mass % of Fe, 4.0 to 7.0 mass % of Cu, 2.0 to 3.5 mass % of Zr, and Co and an unavoidable impurity as a remainder (the R is any one of a combination of Sm and Nd (where 0<Nd≤25 mass %, and a remainder is Sm), a combination of Sm and Pr (where 0<Pr≤25 mass %, and a remainder is Sm), or a combination of Sm, Nd, and Pr (where 0<Nd+Pr≤25 mass %, and a remainder is Sm));
b. a step (II) of pulverizing the alloy into powder;
c. a step (III) of compression-molding the powder into a molded body;
d. a step (IV) of sintering the molded body into a sintered body by heating the molded body at 1190 to 1225° C. for 0.5 to 3.0 hours;
e. a solution heat treatment step (V) of heating the sintered body at 1120 to 1180° C. for 20 to 100 hours;
f. a rapid cooling step (VI) of lowering a temperature at a cooling rate of no less than 60° C./min at least from a solution heat treatment temperature to 600° C. after the solution heat treatment step (V); and
g. an aging treatment step (VII) of forming a cell phase that includes a crystalline phase of a $Th_2Zn_{17}$ structure and a cell wall that includes a crystalline phase of an $RCo_5$ structure enclosing the cell phase.

The concentration of the R in the cell wall is higher than a concentration of the R in the cell phase by no less than 25 atomic %.

Figure 4:
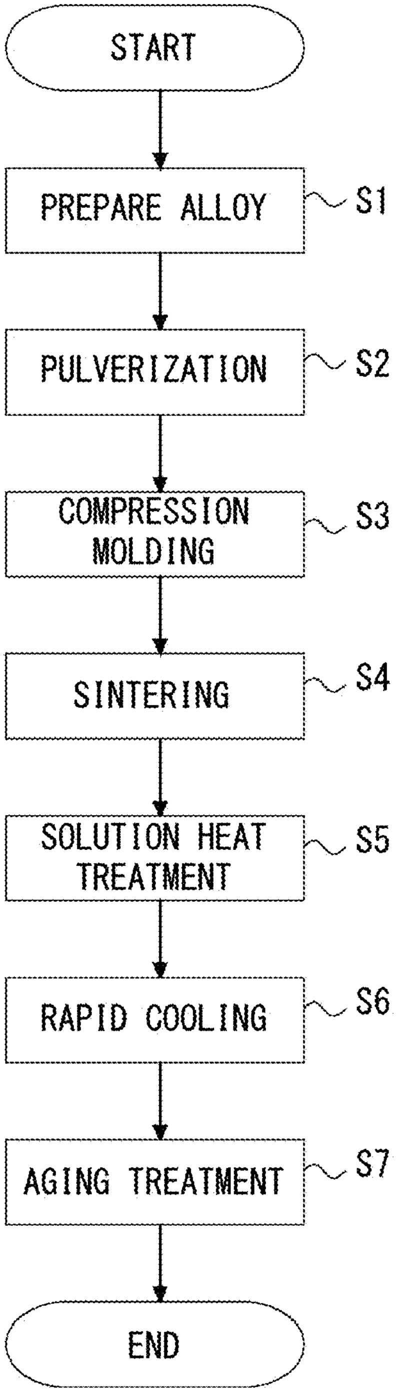
FIG. 4 is a flowchart for describing an example of steps of manufacturing a rare-earth cobalt permanent magnet.

The method of manufacturing the rare-earth cobalt permanent magnet according to the present embodiment described above makes it possible to manufacture a rare-earth cobalt permanent magnet having superior magnetic characteristics (in particular, a high squareness ratio). With reference to the flowchart illustrated in FIG. 4, each step of the method of manufacturing the rare-earth cobalt permanent magnet according to the present embodiment will be described below.

First, an alloy that comprises, 24 to 26 mass % of a rare-earth element R including Sm, 25% to 27 mass % of Fe, 4.0 to 7.0 mass % of Cu, 2.0 to 3.5 mass % of Zr, and Co and an unavoidable impurity as a remainder is prepared (step S1: the step (I)). In the above, the rare-earth element R is any one of a combination of Sm and Nd (in which 0<Nd≤25 mass %, and a remainder is Sm), a combination of Sm and Pr (in which 0<Pr≤25 mass %, and a remainder is Sm), or a combination of Sm, Nd, and Pr (in which 0<Nd+Pr≤25 mass %, and a remainder is Sm). There is no particular limitation on the method of preparing the alloy. The alloy may be prepared by obtaining a commercially available alloy having a desired composition or by compounding each element to achieve a desired composition. A specific example of compounding each element will be described below, but the present disclosure is not limited to this method.

First, as source materials, master alloys of Fe, Cu, Zr, Co, a rare-earth element R that includes Sm, and so on are prepared. The rare-earth element R is any one of a combination of Sm and Nd, a combination of Sm and Pr, or a combination of Sm, Nd, and Pr. Here, it is preferable to select a master alloy of a composition having a low eutectic temperature as this helps obtain an alloy having a uniform composition. Additionally, FeZr or CuZr may be selected as a master alloy. In one example, FeZr of around Fe80%/Zr20% is suitable. In addition, in one example, CuZr of around Cu50%/Zr50% is suitable.

These source materials are compounded to achieve a desired composition. The compound is then placed in a crucible of Al or the like and molten by a high-frequency melting furnace in a vacuum of no more than $1\times10^{-2}$ torr or in an inert gas atmosphere. Thus, a uniform alloy is obtained. The present disclosure may further include a step of casting the molten alloy with a mold to obtain an alloy ingot. In another method, the molten alloy may be dripped onto a copper roll to manufacture alloy flakes having a thickness of approximately 1 mm (strip casting technique).

In a case where an alloy ingot has been obtained through the casting, it is preferable to have a step (VIII) of subjecting the alloy ingot to a heat treatment at its solution heat treatment temperature for 1 to 20 hours before the step (II) described later. The step (VIII) can make the composition more uniform. The solution heat treatment temperature of the alloy ingot may be adjusted as appropriate in accordance with the composition or the like of the alloy.

Next, the alloy is pulverized into powder (step S2: the step (II)). There is no particular limitation on the method of pulverizing the alloy, and any method may be selected from known methods. In one example of a suitable method, first, the alloy ingot or the alloy flakes are roughly pulverized by a known pulverizer to the size of approximately 100 to 500 μm, and the roughly pulverized alloy is then finely pulverized by a ball mill, a jet mill, or the like. There is no particular limitation on the mean particle size of the powder. Yet, to reduce the sintering duration in the sintering step described later and to manufacture a uniform permanent magnet, the powder preferably has a mean particle size of 1 to 10 μm, or the mean particle size is preferably around 6 μm.

Next, the obtained powder is compression-molded into a molded body having a desired shape (step S3: the step (III)). In the present disclosure, to improve the magnetic characteristics by aligning the crystal orientations of the powder, it is preferable to compression-mold the powder in a constant magnetic field. There is no particular limitation on the relationship between the direction of the magnetic field and the pressing direction, and this relationship may be selected as appropriate in accordance with the shape or the like of the product. For example, in a case where a ring magnet or a thin plate-like magnet is to be manufactured, a parallel magnetic field press in which the magnetic field is applied in the direction parallel to the pressing direction can be employed. Meanwhile, for superior magnetic characteristics, a perpendicular magnetic field press in which the magnetic field is applied perpendicular to the pressing direction is preferable.

There is no particular limitation on the magnitude of the magnetic field. The magnetic field may be of no more than 15 kOe or may be of no less than 15 kOe, for example, depending on the intended use or the like of the product. In particular, for superior magnetic characteristics, it is preferable to compression-mold the powder in a magnetic field of no less than 15 kOe. The pressure to be applied in the compression molding may be adjusted as appropriate in accordance with the size, the shape, or the like of the product. In one example, the pressure can be set to 0.5 to 2.0 ton/cm$^2$. In other words, in the method of manufacturing the rare-earth cobalt permanent magnet according to the present disclosure, from the standpoint of the magnetic characteristics, it is particularly preferable to compression-mold the powder in a magnetic field of no less than 15 kOe and with a pressure of 0.5 to 2.0 ton/cm$^2$ applied perpendicularly to the magnetic field.

Next, the molded body is sintered into a sintered body by heating the molded body at 1190 to 1225° C. for 0.5 to 3.0 hours (step S4: the step (IV)). Sintering the molded body at no lower than 1190° C. for no less than 0.5 hours allows an obtained sintered body to be sufficiently compact. In addition, heating the molded body at no higher than 1225° C. for no more than 3.0 hours keeps the rare-earth element, or in particular Sm, from evaporating, and a permanent magnet with superior magnetic characteristics can be manufactured. In the present disclosure, the sintering temperature is preferably 1195 to 1220° C., and the sintering duration is preferably 40 minutes to 2 hours. From the standpoint of suppressing oxidation, the sintering step is preferably performed in a vacuum of no more than $1\times10^{-2}$ torr or in an inert gas atmosphere.

Next, the solution heat treatment of heating the sintered body at 1120 to 1180° C. for 20 to 100 hours is performed (step S5: the step (V)). Heating the sintered body at no lower than 1120° C. can make the composition of the molded body uniform and makes it possible to form the 1-7 phase, which is a precursor for making the crystalline phase of a $Th_2Zn_{17}$ structure a primary phase in the aging treatment step (step S7: the step (VII)) described later. Meanwhile, if the heating temperature exceeds 1180° C., the 1-7 phase is formed less easily, and the rare-earth element may evaporate further. An optimal solution heat treatment temperature for the sintered body varies in accordance with the composition of the sintered body, and thus the solution heat treatment temperature is preferably adjusted as appropriate within the temperature range described above.

For forming the 1-7 phase sufficiently and for making each element uniform, the duration of the solution heat treatment is no less than 20 hours. In addition, for suppressing evaporation of the rare-earth element or in particular Sm, the duration of the solution heat treatment is preferably no more than 100 hours. From the standpoint of suppressing oxidation, the solution heat treatment described above is preferably performed in a vacuum of no more than $1\times10^{-2}$ torr or in an inert gas atmosphere.

From the standpoint of improving the productivity, the sintering step (IV) and the solution heat treatment step (V) are preferably performed in series. In other words, it is preferable that the molded body be heated at 1190 to 1225° C. for 0.5 to 3.0 hours and then the solution heat treatment be performed for 20 to 100 hours with the temperature being adjusted to 1120 to 1180° C. without the temperature being lowered to a room temperature.

Next, in the cooling process after the solution heat treatment step (V), the temperature is lowered at a cooling rate of no less than 60° C./min at least from the solution heat treatment temperature to 600° C. (step S6). This rapid cooling is performed to maintain the crystal structure of the 1-7 phase obtained in the solution heat treatment step (V). If the rapid cooling is not sufficient, the 1-7 phase may change. In particular, reducing the time it takes to lower the temperature from the solution heat treatment temperature to 600° C. makes it possible to maintain the crystal structure of the 1-7 phase. It suffices that the cooling rate be no less than 60° C./min, and the cooling rate is preferably no less than 70° C./min or more preferably no less than 80° C./min. Meanwhile, in one example, the upper limit of the cooling rate is preferably no more than 250° C./min, although it depends on the shape of the molded body.

Next, the molded body that has been rapidly cooled is subjected to an aging treatment to form the 2-17 phase and the 1-5 phase (step S7: the step (VII)). There is no particular limitation on the aging temperature. To obtain a rare-earth cobalt permanent magnet having the 2-17 phase as a primary phase and having the 2-17 phase and the 1-5 phase that are each homogeneous, it is preferable to hold the molded body at a temperature of 700 to 900° C. for 2 to 20 hours and then to set the cooling rate to no higher than 2° C./min for the duration in which the temperature is lowered to at least 400° C. Holding the molded body at a temperature of 700 to 900° C. for 2 to 20 hours can make each of the 2-17 phase and the 1-5 phase homogeneous. In particular, it is preferable to perform the aging treatment within a temperature range of 800 to 850° C. For obtaining satisfactory magnetic characteristics, the cooling rate is preferably no more than 2° C./min or more preferably no more than 0.5° C./min. If the cooling rate is too high, the elements fail to be concentrated in the 2-17 phase and the 1-5 phase, and satisfactory magnetic characteristics cannot be obtained.

The manufacturing method described above makes it possible to manufacture a rare-earth cobalt permanent magnet having superior magnetic characteristics (in particular, a high squareness ratio).

Observation of Structure and Observation of Magnetic Domain

Next, a method of observing a microstructure of the rare-earth cobalt permanent magnet according to the present disclosure with the use of TEM will be described. A sample subjected to the aging treatment in step S7 is cut out into an appropriate shape, and a thin slice is cut out from the sample along an easy axis of magnetization. At this point, a surface perpendicular to the easy axis of magnetization appears. This thinly cut-out surface includes the direction perpendicular to the easy axis of magnetization. This surface is irradiated with an electron beam, and an image formed by the electron beam transmitted therethrough is observed.

Next, a method of observing a magnetic domain in the rare-earth cobalt permanent magnet according to the present disclosure with the use of a Kerr-effect microscope will be described. A Kerr-effect microscope is a device for observing a magnetic domain with a microscope through the magneto-optical Kerr effect. The magneto-optical Kerr effect is a phenomenon in which when a linearly polarized light is made incident on a magnetic body, the reflected light becomes an elliptically polarized light and the polarization direction rotates from the linear direction of the incident light. There are known three types of magneto-optical Kerr effects: "the polar Kerr effect" in which light is made incident in the direction normal to the magnetization direction of a magnetic body, "the longitudinal Kerr effect" in which light is made incident in the direction parallel to the magnetization direction, and "the transversal Kerr effect" in which light is made incident in the direction perpendicular to the magnetization direction within the plane of incidence. In the present disclosure, the magnetic domain is observed with the use of "the longitudinal Kerr effect." The result of observing the magnetic domain is illustrated in FIG. 2.

Device

The present disclosure can further provide a device that includes the rare-earth cobalt permanent magnet according to the present disclosure described above. Specific examples of such a device include a clock, an electric motor, various measuring instruments, a communication device, a computer terminal, a loudspeaker, a video disk, and a sensor. The magnetic force of the rare-earth cobalt permanent magnet according to the present disclosure is resistant to degradation even in a high-temperature environment. Thus, the rare-earth cobalt permanent magnet according to the present disclosure can be used suitably in an angle sensor, an ignition coil, a driving motor for a hybrid electric vehicle (HEV), or the like to be provided in an engine compartment of a vehicle.

EXAMPLES

The present disclosure will be described in concrete terms with Examples and Comparative Examples below. The following description is not intended to limit the present disclosure.

Examples 1 to 3

A master alloy of Fe80%/Zr20% and each source material were adjusted to achieve the composition of each of Examples 1 to 3 in Table 1, and the master alloy and the source materials were then molten by a high-frequency melting furnace and casted to obtain an alloy ingot. Then, the obtained master alloy was roughly pulverized in an inert gas to achieve a mean particle size of 100 to 500 μm. Thereafter, the roughly pulverized alloy was finely pulverized in an inert gas with the use of a ball mill to achieve a mean particle size of 6 μm, and thus powder was obtained. This powder was pressed in a magnetic field of 15 kOe with a pressure of 1 ton/cm$^2$ applied perpendicularly to the magnetic field, and thus a molded body was obtained.

This molded body was sintered in a vacuum of no more than 10 Pa at 1210° C. for 1.0 hours. The molded body was then subjected to a solution heat treatment at 1150° C. for 30 hours and rapidly cooled at a cooling rate of 80° C./min from 1000° C. to 600° C. After the rapid cooling, the molded body was held at 850° C. for 12 hours and then aged under the condition where the molded body was gradually cooled to 350° C. at a cooling rate of 0.5° C./min. Thus, a rare-earth cobalt permanent magnet of each of Examples 1 to 3 was obtained.

Comparative Examples 1 and 2

Aside from adjusting each source material to achieve the compositions in Table 1, a rare-earth cobalt permanent magnet of each of Comparative Examples 1 and 2 was fabricated through a method similar to that of Example 1 described above. Comparative Example 1 provided a sample with a smaller amount of Fe than Examples 1 to 3. Comparative Example 2 provided a sample with a larger amount of Fe than Examples 1 to 3.

Examples 4 to 9

Aside from adjusting each source material to achieve the compositions in Table 2 and aside from the sintering condition and the solution heat treatment condition, a rare-earth cobalt permanent magnet of each of Examples 4 to 9 was fabricated through a method similar to that of Example 1 described above.

In Examples 4 to 6, the molded body was sintered in a vacuum of no more than 10 Pa at 1190° C. for 3.0 hours. The molded body was then subjected to a solution heat treatment at 1180° C. for 20 hours, 40 hours, and 60 hours, respectively, and rapidly cooled at a cooling rate of 80° C./min from 1000° C. to 600° C. After the rapid cooling, the molded body was held at 850° C. for 10 hours and then aged under the condition where the molded body was gradually cooled to 350° C. at a cooling rate of 0.5° C./min. Thus, a rare-earth cobalt permanent magnet of each of Examples 4 to 6 was obtained.

In Examples 7 to 9, the molded body was sintered in a vacuum of no more than 10 Pa at 1225° C. for 0.5 hours. The molded body was then subjected to a solution heat treatment at 1120° C. for 20 hours, 50 hours, and 100 hours, respectively, and rapidly cooled at a cooling rate of 80° C./min from 1000° C. to 600° C. After the rapid cooling, the molded body was held at 850° C. for 10 hours and then aged under the condition where the molded body was gradually cooled to 350° C. at a cooling rate of 0.5° C./min. Thus, a rare-earth cobalt permanent magnet of each of Examples 7 to 9 was obtained. Here, Sm and Pr were used as the rare-earth element R in Examples 4 to 6, and Sm and Nd were used as the rare-earth element R in Examples 7 to 9. The solution heat treatment temperature was lower in Examples 7 to 9 than in Examples 4 to 6.

Comparative Examples 3 to 6

Aside from adjusting each source material to achieve the compositions in Table 2 and aside from the sintering condition and the solution heat treatment condition, a rare-earth cobalt permanent magnet of each of Comparative Examples 3 to 6 was fabricated through a method similar to that of Example 1 described above.

In Comparative Examples 3 and 4, the molded body was sintered in a vacuum of no more than 10 Pa at 1190° C. for 3.0 hours. The molded body was then subjected to a solution heat treatment at 1180° C. for 5 hours and 10 hours, respectively, and rapidly cooled at a cooling rate of 80° C./min from 1000° C. to 600° C. After the rapid cooling, the molded body was held at 850° C. for 10 hours and then aged under the condition where the molded body was gradually cooled to 350° C. at a cooling rate of 0.5° C./min. Thus, a rare-earth cobalt permanent magnet of each of Comparative Examples 3 and 4 was obtained. Comparative Examples 3 and 4 each provided a sample obtained with a shorter solution heat treatment duration than Examples 4 to 6.

In Comparative Examples 5 and 6, the molded body was sintered in a vacuum of no more than 10 Pa at 1225° C. for 0.5 hours. The molded body was then subjected to a solution heat treatment at 1120° C. for 5 hours and 10 hours, respectively, and rapidly cooled at a cooling rate of 80° C./min from 1000° C. to 600° C. After the rapid cooling, the molded body was held at 850° C. for 10 hours and then aged under the condition where the molded body was gradually cooled to 350° C. at a cooling rate of 0.5° C./min. Thus, a rare-earth cobalt permanent magnet of each of Comparative Examples 5 and 6 was obtained. Comparative Examples 5 and 6 each provided a sample obtained with a shorter solution heat treatment duration than Examples 7 to 9.

Examples 10 to 15

Aside from adjusting each source material to achieve the compositions in Table 3, a rare-earth cobalt permanent magnet of each of Examples 10 to 15 was fabricated through a method similar to that of Example 1 described above. Sm and Nd were used as the rare-earth element R in Examples 10 and 11, Sm and Pr were used as the rare-earth element R in Examples 12 to 13, and Sm, Nd, and Pr were used as the rare-earth element R in Examples 14 to 15.

Comparative Examples 7 and 8

Aside from adjusting each source material to achieve the compositions in Table 3, a rare-earth cobalt permanent magnet of each of Comparative Examples 7 and 8 was fabricated through a method similar to that of Example 1 described above. Comparative Example 7 provided a sample with a smaller amount of the rare-earth element R than Examples 10 to 15. Comparative Example 8 provided a sample with a larger amount of the rare-earth element R than Examples 10 to 15.

Examples 16 to 18

Aside from adjusting each source material to achieve the compositions in Table 4, a rare-earth cobalt permanent magnet of each of Examples 16 to 18 was fabricated through a method similar to that of Example 1 described above. In Examples 16 to 18, the ratio of Nd, Pr, or (Nd+Pr) relative to the rare-earth element R was varied. Specifically, the ratio of Nd relative to the rare-earth element R was (6/(18+6))×100=25.0 mass % in Example 16. The ratio of Pr relative to the rare-earth element R was (6/(19+6))×100=24.0 mass % in Example 17. The ratio of (Nd+Pr) relative to the rare-earth element R was ((3.5+3)/(19.5+3.5+3))×100=25.0 mass % in Example 18.

Comparative Examples 9 and 10

Aside from adjusting each source material to achieve the compositions in Table 4, a rare-earth cobalt permanent magnet of each of Comparative Examples 9 and 10 was fabricated through a method similar to that of Example 1 described above. The ratio of Nd relative to the rare-earth element R was (7/(17+7))×100=29.2 mass % in Comparative Example 9. The ratio of (Nd+Pr) relative to the rare-earth element R was ((3.5+3.5)/(19.0+3.5+3.5))×100=26.9 mass % in Comparative Example 10. The ratio of Nd relative to the rare-earth element R was 29.2 mass % in Comparative Example 9, and this provided a sample with a higher ratio of Nd relative to the rare-earth element R than Example 16. The ratio of (Nd+Pr) relative to the rare-earth element R was 26.9 mass % in Comparative Example 10, and this provided a sample with a higher ratio of (Nd+Pr) relative to the rare-earth element R than Example 18.

Evaluation of Rare-Earth Cobalt Permanent Magnet

The magnetic characteristics of the rare-earth cobalt permanent magnets obtained in Examples and Comparative Examples described above were measured with the molded bodies. The magnetic characteristics were measured with the use of a B-H tracer. The obtained magnetic characteristics, that is, the maximum energy integral (BH)m, the magnetic coercive force (Hcj), and the squareness ratio expressed by the ratio (Hk/Hcj) of the magnetic field (Hk) to the magnetic coercive force (Hcj) are shown in Tables 1 to 4.

In addition, samples fabricated at the same time as the rare-earth cobalt permanent magnets according to Examples and Comparative Examples described above and having the same compositions as the rare-earth cobalt permanent magnets were processed for a magnetic domain observation. The magnetic domain of each processed sample was observed, and the composition of each processed sample was analyzed. The magnetic domain was observed with the use of the Kerr-effect microscope described above.

The compositions of the cell phase (2-17 phase) and the cell wall (1-5 phase) of each of the rare-earth cobalt permanent magnets according to Examples and Comparative Examples described above were measured with the use of energy-dispersive X-ray spectrometry (EDX). Then, the rate of increase in the concentration of Sm in the cell wall (1-5 phase) relative to the concentration of Sm in the cell phase (2-17 phase) was obtained. Specifically, the rate of increase in the concentration of Sm in the cell wall (1-5 phase) was obtained through the following expression, in which $D_{sm1}$ was the concentration of Sm in the cell phase (2-17 phase) and $D_{sm2}$ was the concentration of Sm in the cell wall (1-5 phase).

$$((D_{sm2}-D_{sm1})/D_{sm1})\times 100(\text{at }\%)$$

In addition, the rate of increase in the concentration of Nd, Pr, or (Nd+Pr) in the cell wall (1-5 phase) relative to the concentration of Nd, Pr, or (Nd+Pr) in the cell phase (2-17 phase) was obtained. Specifically, the rate of increase in the concentration of Nd, Pr, or (Nd+Pr) in the cell wall (1-5 phase) was obtained through the following expression, in which $D_{NP1}$ was the concentration of Nd, Pr, or (Nd+Pr) in the cell phase (2-17 phase) and $D_{NP2}$ was the concentration of Nd, Pr, or (Nd+Pr) in the cell wall (1-5 phase).

$$((D_{NP2}-D_{NP1})/D_{NP1})\times 100(\text{at }\%)$$

In Examples and Comparative Examples, there were three patterns of combinations for the rare-earth element R: (1) a combination of Sm and Nd, (2) a combination of Sm and Pr, and (3) a combination of Sm, Nd, and Pr.

Table 1

| | Composition (mass %) | | | | | | Density | (BH)m | Hcj | Hk/Hcj | Rate of Increase in Sm Concen- tration | Rate of Increase in Nd, Pr, Nd + Pr |
|---|---|---|---|---|---|---|---|---|---|---|---|---|
| | Sm | Nd | Fe | Cu | Zr | Co | [g/cm$^3$] | [kJ/m$^3$] | [kA/m] | [%] | [at %] | [at %] |
| Example 1 | 22.5 | 2.5 | 25.0 | 4.35 | 2.15 | Remainder | 8.25 | 260 | 2050 | 70 | 33 | 45 |
| Example 2 | 22.5 | 2.5 | 26.0 | 4.35 | 2.15 | Remainder | 8.30 | 270 | 1885 | 73 | 35 | 50 |
| Example 3 | 22.5 | 2.5 | 27.0 | 4.35 | 2.15 | Remainder | 8.35 | 265 | 1675 | 67 | 31 | 32 |
| Comparative Example 1 | 22.5 | 2.5 | 23.0 | 4.35 | 2.15 | Remainder | 8.20 | 250 | 2250 | 52 | 23 | 25 |
| Comparative Example 2 | 22.5 | 2.5 | 28.0 | 4.35 | 2.15 | Remainder | 8.40 | 250 | 1500 | 61 | 22 | 22 |

TABLE 2

| | Compositon (mass %) | | | | | | | Solution Heat Treat- ment Tem- perature | Solution Heat Treatment Duration | Density | (BH)m | Hcj | Hk/ Hcj | Rate of Increase in Sm Concen- tration | Rate of Increase in Nd, Pr, Nd + Pr |
|---|---|---|---|---|---|---|---|---|---|---|---|---|---|---|---|
| | Sm | Nd | Pr | Fe | Cu | Zr | Co | [° C.] | [h] | [g/cm$^3$] | [kJ/m$^3$] | [kA/m] | [%] | [at %] | [at %] |
| Example 4 | 24.0 | — | 2.0 | 26.5 | 4.45 | 2.45 | Remainder | 1180 | 20 | 8.25 | 255 | 1950 | 66 | 40 | 30 |
| Example 5 | 24.0 | — | 2.0 | 26.5 | 4.45 | 2.45 | Remainder | 1180 | 40 | 8.28 | 265 | 1860 | 71 | 36 | 35 |
| Example | 24.0 | — | 2.0 | 26.5 | 4.45 | 2.45 | Remainder | 1180 | 60 | 8.29 | 260 | 1730 | 70 | 25 | 27 |
| Comparative Example 3 | 24.0 | — | 2.0 | 26.5 | 4.45 | 2.45 | Remainder | 1180 | 5 | 8.20 | 245 | 1570 | 45 | 24 | 23 |
| Comparative Example 4 | 24.0 | — | 2.0 | 26.5 | 4.45 | 2.45 | Remainder | 1180 | 10 | 8.30 | 250 | 1540 | 62 | 20 | 20 |
| Example 7 | 21.0 | 3.0 | — | 25.5 | 4.60 | 2.30 | Remainder | 1120 | 20 | 8.28 | 255 | 2057 | 65 | 31 | 28 |
| Example 8 | 21.0 | 3.0 | — | 25.5 | 4.60 | 2.30 | Remainder | 1120 | 50 | 8.31 | 270 | 1800 | 68 | 41 | 35 |
| Example 9 | 21.0 | 3.0 | — | 25.5 | 4.60 | 2.30 | Remainder | 1120 | 100 | 8.33 | 268 | 1613 | 63 | 26 | 26 |
| Comparative Examples | 21.0 | 3.0 | — | 25.5 | 4.60 | 2.30 | Remainder | 1120 | 5 | 8.24 | 247 | 2125 | 50 | 23 | 30 |
| Comparative Example 6 | 21.0 | 3.0 | — | 25.5 | 4.60 | 2.30 | Remainder | 1120 | 10 | 8.34 | 253 | 1330 | 60 | 10 | 15 |

TABLE 3

| | Composition (mass %) | | | | | | | Amount of R (mass %) | Density | (BH)m | Hcj | Hk/ Hcj | Rate of Increase in Sm Concen- tration | Rate of Increase in Nd, Pr, Nd + Pr |
|---|---|---|---|---|---|---|---|---|---|---|---|---|---|---|
| | Sm | Nd | Pr | Fe | Cu | Zr | Co | | [g/cm$^3$] | [kJ/m$^3$] | [kA/m] | [%] | [at %] | [at %] |
| Example 10 | 18.0 | 6.0 | — | 25.0 | 4.65 | 2.0 | Remainder | 24.0 | 8.30 | 266 | 2018 | 71 | 40 | 45 |
| Example 11 | 20.0 | 5.0 | — | 25.0 | 4.85 | 2.45 | Remainder | 25.0 | 8.28 | 265 | 1818 | 70 | 37 | 40 |
| Example 12 | 18.0 | — | 6.0 | 26.0 | 4.20 | 2.70 | Remainder | 24.0 | 8.29 | 263 | 1634 | 69 | 32 | 34 |
| Example 13 | 20.0 | — | 5.0 | 26.0 | 5.0 | 2.20 | Remainder | 25.0 | 8.27 | 260 | 1777 | 67 | 34 | 31 |
| Example 14 | 20.0 | 3.0 | 3.0 | 27.0 | 4.35 | 2.35 | Remainder | 26.0 | 8.30 | 270 | 1706 | 73 | 33 | 33 |
| Example 15 | 20.0 | 2.5 | 2.5 | 27.0 | 4.50 | 2.60 | Remainder | 25.0 | 8.28 | 273 | 1800 | 71 | 28 | 25 |
| Comparative Example 7 | 16.0 | 7.0 | — | 25.0 | 4.65 | 2.15 | Remainder | 23.0 | 8.25 | 263 | 1381 | 61 | 10 | 30 |
| Comparative Example 8 | 20.0 | — | 7.0 | 27.0 | 4.65 | 2.15 | Remainder | 27.0 | 8.24 | 263 | 1557 | 48 | 15 | 22 |

TABLE 4

| | Composition (mass %) | | | | | | | Ratio of Nd, Pr, (Nd + Pr) | Density | (BH)m | Hcj | Hk/Hcj | Rate of Increase in Sm Concentration | Rate of Increase in Nd, Pr, Nd + Pr |
|---|---|---|---|---|---|---|---|---|---|---|---|---|---|---|
| | Sm | Nd | Pr | Fe | Cu | Zr | Co | | [g/cm$^3$] | ]kJ/m$^3$] | [kA/m] | [%] | [at %] | [at %] |
| Example 16 | 18.0 | 6.0 | — | 25.0 | 4.65 | 2.0 | Remainder | 25.0 | 8.30 | 258 | 1700 | 66 | 29 | 31 |
| Example 17 | 19.0 | — | 6.0 | 26.0 | 4.85 | 2.45 | Remainder | 24.0 | 8.28 | 260 | 1648 | 65 | 33 | 30 |
| Example 18 | 19.5 | 3.5 | 3.0 | 27.0 | 4.20 | 2.70 | Remainder | 25.0 | 8.29 | 261 | 1606 | 63 | 27 | 28 |
| Comparative Example 9 | 17.0 | 7.0 | — | 25.0 | 4.65 | 2.15 | Remainder | 29.2 | 8.25 | 253 | 1575 | 60 | 22 | 24 |
| Comparative Example 10 | 19.0 | 3.5 | 3.5 | 27.0 | 4.20 | 2.70 | Remainder | 26.9 | 8.24 | 245 | 1541 | 50 | 15 | 26 |

Summary of Results: Table 1

The result summarized in Table 1 shows the differences in the characteristics of the rare-earth cobalt permanent magnets appearing when the composition of Fe differs. As shown in Table 1, the amount of Fe is 25.0 to 27.0 mass % in Examples 1 to 3. Comparative Example 1 provides a sample with a smaller amount of Fe than Examples 1 to 3, and the amount of Fe is 23.0 mass %. Comparative Example 2 provides a sample with a larger amount of Fe than Examples 1 to 3, and the amount of Fe is 28.0 mass %.

In the rare-earth cobalt permanent magnets of Examples 1 to 3, the density is no less than 8.25 g/cm$^3$, the maximum energy integral (BH)m is no less than 260 kJ/m$^3$, the magnetic coercive force Hcj is no less than 1675 A/m, and the squareness ratio Hk/Hcj is no less than 67%.

In the rare-earth cobalt permanent magnets of Examples 1 to 3, the change in the composition of Sm and the change in the composition of Nd in the rare-earth cobalt permanent magnet show similar tendencies. The concentration of Sm in the cell wall (1-5 phase) is higher than the concentration of Sm in the cell phase (2-17 phase) by no less than 31 at %. In addition, the concentration of Nd in the cell wall (1-5 phase) is higher than the concentration of Nd in the cell phase (2-17 phase) by no less than 32 at %.

The result of observing the magnetic domain with the use of the Kerr-effect microscope shows that the reverse magnetic domain has appeared from the crystal grain boundaries and then started propagating into the crystal grains in each of the rare-earth cobalt permanent magnets of Examples 1 to 3, as illustrated in the schematic diagram in FIG. 3. In addition, a process in which a separate reverse magnetic domain has appeared from within the crystal grains and propagated throughout the crystal grains in the end was observed.

Meanwhile, in Comparative Example 1 in which the amount of Fe is smaller than that in Examples 1 to 3, the squareness ratio Hk/Hcj is 52%, and the value of the squareness ratio Hk/Hcj is lower than that in Examples 1 to 3. In Comparative Example 2 in which the amount of Fe is larger than that in Examples 1 to 3, the squareness ratio Hk/Hcj is 61%, and the value of the squareness ratio Hk/Hcj is lower than that in Examples 1 to 3.

In Comparative Examples 1 and 2, the change in the composition of Sm and the change in the composition of Nd in the rare-earth cobalt permanent magnet have failed to show similar tendencies. In addition, in Comparative Examples 1 and 2, the rate of increase in the concentration of Sm in the cell wall (1-5 phase) and the rate of increase in the concentration of Nd in the cell wall (1-5 phase) never reach or exceed 25 at % at the same time.

The result of observing the magnetic domain with the use of the Kerr-effect microscope shows that the reverse magnetic domain has started appearing within the crystal grains, then appeared from the crystal grain boundaries, and lastly propagated throughout the crystal grains in each of the rare-earth cobalt permanent magnets of Comparative Examples 1 and 2. The reverse magnetic domain exhibited behaviors different from those of Examples 1 to 3.

Summary of Results: Table 2

The result summarized in Table 2 shows the differences in the characteristics of the rare-earth cobalt permanent magnets appearing when the type of the rare-earth element and the solution heat treatment condition differ. In Examples 4 to 6 shown in Table 2, the rare-earth cobalt permanent magnet includes Sm and Pr as the rare-earth element, the solution heat treatment temperature is 1180° C., and the solution heat treatment duration is 20 hours, 40 hours, and 60 hours, respectively. Comparative Examples 3 and 4 each provide a sample obtained with a shorter solution heat treatment duration than Examples 4 to 6, and the solution heat treatment duration is 5 hours and 10 hours, respectively.

In Examples 7 to 9, the rare-earth cobalt permanent magnet includes Sm and Nd as the rare-earth element, the solution heat treatment temperature is 1120° C., and the solution heat treatment duration is 20 hours, 50 hours, and 100 hours, respectively. Comparative Examples 5 and 6 each provide a sample obtained with a shorter solution heat treatment duration than Examples 7 to 9, and the solution heat treatment duration is 5 hours and 10 hours, respectively.

In the rare-earth cobalt permanent magnets of Examples 4 to 9, the density is no less than 8.25 g/cm$^3$, the maximum energy integral (BH)m is no less than 255 kJ/m$^3$, the magnetic coercive force Hcj is no less than 1613 A/m, and the squareness ratio Hk/Hcj is no less than 63%.

In the rare-earth cobalt permanent magnets of Examples 4 to 9, the change in the composition of Sm and the change in the composition of Pr or Nd in the rare-earth cobalt permanent magnet show similar tendencies. The concentration of Sm in the cell wall (1-5 phase) is higher than the concentration of Sm in the cell phase (2-17 phase) by no less than 25 at %. In addition, the concentration of Pr or Nd in the cell wall (1-5 phase) is higher than the concentration of Pr or Nd in the cell phase (2-17 phase) by no less than 26 at %.

The result of observing the magnetic domain with the use of the Kerr-effect microscope shows that the reverse magnetic domain has appeared from the crystal grain boundaries and then started propagating into the crystal grains in each of the rare-earth cobalt permanent magnets of Examples 4 to 9, as illustrated in the schematic diagram in FIG. 3. In addition, a process in which a separate reverse magnetic domain has appeared from within the crystal grains and propagated throughout the crystal grains in the end was observed.

Meanwhile, in Comparative Examples 3 and 4 in which the solution heat treatment duration is shorter than that in Examples 4 to 6, the squareness ratio Hk/Hcj is 45% and 62%, respectively, and the value of the squareness ratio Hk/Hcj is lower than that in Examples 4 to 6. In Comparative Examples 5 and 6 in which the solution heat treatment duration is shorter than that in Examples 7 to 9, the squareness ratio Hk/Hcj is 50% and 60%, respectively, and the value of the squareness ratio Hk/Hcj is lower than that in Examples 7 to 9.

In Comparative Examples 3 to 6, the change in the composition of Sm and the change in the composition Pr or Nd in the rare-earth cobalt permanent magnet have failed to show similar tendencies. In addition, in Comparative Examples 3 and 4, the rate of increase in the concentration of Sm in the cell wall (1-5 phase) and the rate of increase in the concentration of Pr in the cell wall (1-5 phase) never reach or exceed 25 at % at the same time. In addition, in Comparative Examples 5 and 6, the rate of increase in the concentration of Sm in the cell wall (1-5 phase) and the rate of increase in the concentration of Nd in the cell wall (1-5 phase) never reach or exceed 25 at % at the same time.

The result of observing the magnetic domain with the use of the Kerr-effect microscope shows that the reverse magnetic domain has started appearing within the crystal grains, then appeared from the crystal grain boundaries, and lastly propagated throughout the crystal grains in each of the rare-earth cobalt permanent magnets of Comparative Examples 3 to 6. The reverse magnetic domain exhibited behaviors different from those of Examples 4 to 9.

Summary of Results: Table 3

The result summarized in Table 3 shows the differences in the characteristics of the rare-earth cobalt permanent magnets appearing when the composition and the type of the rare-earth element R differ. As shown in Table 3, the amount of the rare-earth element R is 24.0 to 26.0 mass % in Examples 10 to 15. In Examples 10 and 11, the rare-earth cobalt permanent magnet includes Sm and Nd as the rare-earth element R. In Examples 12 and 13, the rare-earth cobalt permanent magnet includes Sm and Pr as the rare-earth element R. In Examples 14 and 15, the rare-earth cobalt permanent magnet includes Sm, Nd, and Pr as the rare-earth element R. Comparative Example 7 provides a sample with a smaller amount of the rare-earth element R than Examples 10 to 15, and the amount of the rare-earth element R is 23.0 mass %. Comparative Example 8 provides a sample with a larger amount of the rare-earth element R than Examples 10 to 15, and the amount of the rare-earth element R is 27.0 mass %.

In the rare-earth cobalt permanent magnets of Examples 10 to 15, the density is no less than 8.27 g/cm$^3$, the maximum energy integral (BH)m is no less than 260 kJ/m$^3$, the magnetic coercive force Hcj is no less than 1634 A/m, and the squareness ratio Hk/Hcj is no less than 67%.

In the rare-earth cobalt permanent magnets of Examples 10 to 15, the change in the composition of Sm, the change in the composition of Nd, and the change in the composition of Pr in the rare-earth cobalt permanent magnet show similar tendencies. The concentration of Sm in the cell wall (1-5 phase) is higher than the concentration of Sm in the cell phase (2-17 phase) by no less than 28 at %. In addition, the concentration of Nd, Pr, or (Nd+Pr) in the cell wall (1-5 phase) is higher than the concentration of Nd, Pr, or (Nd+Pr) in the cell phase (2-17 phase) by no less than 25 at %.

The result of observing the magnetic domain with the use of the Kerr-effect microscope shows that the reverse magnetic domain has appeared from the crystal grain boundaries and then started propagating into the crystal grains in each of the rare-earth cobalt permanent magnets of Examples 10 to 15, as illustrated in the schematic diagram in FIG. 3. In addition, a process in which a separate reverse magnetic domain has appeared from within the crystal grains and propagated throughout the crystal grains in the end was observed.

Meanwhile, in Comparative Example 7 in which the amount of the rare-earth element R is smaller than that in Examples 10 to 15, the squareness ratio Hk/Hcj is 61%, and the value of the squareness ratio Hk/Hcj is lower than that in Examples 10 to 15. In Comparative Example 8 in which the amount of the rare-earth element R is larger than that in Examples 10 to 15, the squareness ratio Hk/Hcj is 48%, and the value of the squareness ratio Hk/Hcj is lower than that in Examples 10 to 15.

In Comparative Examples 7 and 8, the change in the composition of Sm, the change in the composition of Nd, and the change in the composition of Pr in the rare-earth cobalt permanent magnet have failed to show similar tendencies. In addition, in Comparative Examples 7 and 8, the rate of increase in the concentration of Sm in the cell wall (1-5 phase) and the rate of increase in the concentration of Nd, Pr, or (Nd+Pr) in the cell wall (1-5 phase) never reach or exceed 25 at % at the same time.

The result of observing the magnetic domain with the use of the Kerr-effect microscope shows that the reverse magnetic domain has started appearing within the crystal grains, then appeared from the crystal grain boundaries, and lastly propagated throughout the crystal grains in each of the rare-earth cobalt permanent magnets of Comparative Examples 7 and 8. The reverse magnetic domain exhibited behaviors different from those of Examples 10 to 15.

Summary of Results: Table 4

The result summarized in Table 4 shows the differences in the characteristics of the rare-earth cobalt permanent magnets appearing when the composition of Nd, Pr, or (Nd+Pr) serving as the rare-earth element differs. As shown in Table 4, the ratio of Nd, Pr, or (Nd+Pr) is 24.0 to 25.0 mass % in Examples 16 to 18. The ratio of Nd to the rare-earth element R is 29.2 mass % in Comparative Example 9. The ratio of (Nd+Pr) to the rare-earth element R is 26.9 mass % in Comparative Example 10.

In the rare-earth cobalt permanent magnets of Examples 16 to 18, the density is no less than 8.28 g/cm$^3$, the maximum energy integral (BH)m is no less than 260 kJ/m$^3$, the magnetic coercive force Hcj is no less than 1606 A/m, and the squareness ratio Hk/Hcj is no less than 63%.

In the rare-earth cobalt permanent magnets of Examples 16 to 18, the change in the composition of Sm, the change in the composition Nd, and the change in the composition Pr in the rare-earth cobalt permanent magnet show similar tendencies. The concentration of Sm in the cell wall (1-5 phase) is higher than the concentration of Sm in the cell phase (2-17 phase) by no less than 27 at %. The concentration of Nd, Pr, or (Nd+Pr) in the cell wall (1-5 phase) is higher than the concentration of Nd, Pr, or (Nd+Pr) in the cell phase (2-17 phase) by no less than 28 at %.

The result of observing the magnetic domain with the use of the Kerr-effect microscope shows that the reverse magnetic domain has appeared from the crystal grain boundaries and then started propagating into the crystal grains in each of the rare-earth cobalt permanent magnets of Examples 16 to 18, as illustrated in the schematic diagram in FIG. 3. In addition, a process in which a separate reverse magnetic domain has appeared from within the crystal grains and propagated throughout the crystal grains in the end was observed.

Meanwhile, in Comparative Example 9, the squareness ratio Hk/Hcj is 60%, and the value of the squareness ratio Hk/Hcj is lower than that in Examples 16 to 18. In Comparative Example 10, the squareness ratio Hk/Hcj is 50%, and the value of the squareness ratio Hk/Hcj is lower than that in Examples 16 to 18.

In Comparative Examples 9 and 10, the change in the composition of Sm, the change in the composition of Nd, and the change in the composition of Pr in the rare-earth cobalt permanent magnet have failed to show similar tendencies. In addition, in Comparative Examples 9 and 10, the rate of increase in the concentration of Sm in the cell wall (1-5 phase) and the rate of increase in the concentration of Nd or (Nd+Pr) in the cell wall (1-5 phase) never reach or exceed 25 at % at the same time.

The result of observing the magnetic domain with the use of the Kerr-effect microscope shows that the reverse magnetic domain has started appearing within the crystal grains, then appeared from the crystal grain boundaries, and lastly propagated throughout the crystal grains in each of the rare-earth cobalt permanent magnets of Comparative Examples 9 and 10. The reverse magnetic domain exhibited behaviors different from those of Examples 10 to 15.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The invention claimed is:

1. A rare-earth cobalt permanent magnet comprising:

24 to 26 mass % of a rare-earth element R including Sm;

26 to 27 mass % of Fe;

4.2 to 4.6 mass % of Cu;

2.0 to 3.5 mass % of Zr; and

Co and an unavoidable impurity as a remainder, wherein the R is a combination of Sm, Nd, and Pr where $6.0<Nd+Pr\leq 25$ mass %, and a remainder is Sm, the rare-earth cobalt permanent magnet includes a cell phase including a crystalline phase of a $Th_2Zn_{17}$ structure, and a cell wall including a crystalline phase of an $RCO_5$ structure enclosing the cell phase, a concentration of the R in the cell wall is higher than a concentration of the R in the cell phase by no less than 25 atomic %, and the rare-earth cobalt permanent magnet has a squareness ratio of no less than 67%, the squareness ratio being expressed by a ratio (Hk/Hcj) of a magnetic field (Hk) to a magnetic coercive force (Hcj), wherein the magnetic field (Hk) is a reverse magnetic field in which a magnetic flux density is at 90% of a residual magnetic flux density.

2. The rare-earth cobalt permanent magnet according to claim 1, wherein the Zr is 2.1 to 2.5 mass %.

3. The rare-earth cobalt permanent magnet according to claim 1, wherein a density of the rare-earth cobalt permanent magnet is 8.20 to 8.45 g/cm$^3$.

4. The rare-earth cobalt permanent magnet according to claim 1, wherein a density of the rare-earth cobalt permanent magnet is 8.25 to 8.40 g/cm$^3$.

5. The rare-earth cobalt permanent magnet according to claim 1, wherein the Sm and at least one of the Nd and the Pr show the same trend in a change in a composition from the cell phase to the cell wall in the rare-earth cobalt permanent magnet.

6. The rare-earth cobalt permanent magnet according to claim 1, wherein when a reverse magnetic field is applied to the rare-earth cobalt permanent magnet, a reverse magnetic domain that has appeared from in a crystal grain boundary propagates into a crystal grain, another reverse magnetic domain then appears in the crystal grain, and the reverse magnetic domain propagates throughout the crystal grain.

7. A device comprising:

the earth cobalt permanent magnet according to claim 1.

* * * * *